United States Patent
Padua et al.

(10) Patent No.: US 12,516,787 B2
(45) Date of Patent: Jan. 6, 2026

(54) SYSTEMS AND METHODS OF DYNAMIC LIGHTING EFFECTS

(71) Applicant: Universal City Studios LLC, Universal City, CA (US)

(72) Inventors: Andrew Padua, Orlando, FL (US); Gregory Shellman Hall, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 24 days.

(21) Appl. No.: 18/673,085

(22) Filed: May 23, 2024

(65) Prior Publication Data
US 2025/0361994 A1   Nov. 27, 2025

(51) Int. Cl.
| | |
|---|---|
| *F21S 4/22* | (2016.01) |
| *F21S 8/08* | (2006.01) |
| *F21V 19/00* | (2006.01) |
| *F21V 23/00* | (2015.01) |
| *F21V 23/04* | (2006.01) |
| *F21Y 107/70* | (2016.01) |
| *F21Y 113/00* | (2016.01) |
| *F21Y 115/10* | (2016.01) |

(52) U.S. Cl.
CPC . *F21S 4/22* (2016.01); *F21S 8/08* (2013.01); *F21V 19/001* (2013.01); *F21V 23/003* (2013.01); *F21V 23/0492* (2013.01); *F21Y 2107/70* (2016.08); *F21Y 2113/00* (2013.01); *F21Y 2115/10* (2016.08)

(58) Field of Classification Search
CPC .. F21S 4/22; F21S 8/08; F21V 19/001; F21V 23/003; F21V 23/0492
See application file for complete search history.

(56) References Cited

U.S. PATENT DOCUMENTS

| | | | |
|---|---|---|---|
| 5,142,463 A | 8/1992 | Panagotacos et al. | |
| 5,463,536 A * | 10/1995 | Chou | A45B 3/02 362/102 |
| 6,401,404 B1 * | 6/2002 | Fillipp | B44C 5/00 40/538 |
| 9,955,551 B2 | 4/2018 | Spero | |
| 9,964,259 B2 * | 5/2018 | Hudson | F21K 9/20 |
| 10,161,602 B1 | 12/2018 | Bleile | |
| 11,389,743 B2 | 7/2022 | Witt et al. | |
| 2002/0118539 A1 | 8/2002 | Hornsby et al. | |
| 2004/0100791 A1 * | 5/2004 | Bilotti | A45B 3/04 362/249.14 |

(Continued)

OTHER PUBLICATIONS

GB 400 Wtt RGB + CCT Balloon Light Kit, SeeDevil Lighting and Power, accessed May 23, 2024. https://seedevil.com/products/g3-400-watt-rgb-cct-led-balloon-light-kit?variant=44681543483618 &currency=USD&utm_medium=product_sync&utm_source=google &utm_content=sag_organic&utm_campaign=sag_organic.

(Continued)

*Primary Examiner* — Bryon T Gyllstrom
(74) *Attorney, Agent, or Firm* — Fletcher Yoder P.C.

(57) ABSTRACT

A lighting system includes a central support structure and one or more adjustable arms coupled to the central support structure. The one or more adjustable arms are configured to transition between a retracted position and an extended position, and a plurality of light sources are disposed along the one or more adjustable arms.

20 Claims, 8 Drawing Sheets

(56) References Cited

U.S. PATENT DOCUMENTS

| | | | | |
|---|---|---|---|---|
| 2005/0253533 A1* | 11/2005 | Lys | ............. | F21V 23/003 |
| | | | | 315/291 |
| 2006/0070642 A1* | 4/2006 | Lo | ............. | A45B 3/04 |
| | | | | 135/910 |
| 2009/0090404 A1* | 4/2009 | Kuelbs | ............. | A45B 25/14 |
| | | | | 135/16 |
| 2012/0091903 A1 | 4/2012 | Bembridge et al. | | |
| 2013/0120960 A1* | 5/2013 | Harooni | ............. | G03B 17/56 |
| | | | | 362/16 |
| 2021/0108782 A1 | 4/2021 | Todd | | |
| 2022/0253153 A1 | 8/2022 | Guarasci et al. | | |
| 2023/0241528 A1 | 8/2023 | Padua et al. | | |
| 2023/0367988 A1 | 11/2023 | Goergen et al. | | |
| 2024/0217430 A1* | 7/2024 | Massa | ............. | B60Q 1/2692 |

OTHER PUBLICATIONS

Exterior-Automated Lights, Elation, accessed May 23, 2024. https://www.elationlighting.com/exterior-moving-lights.

PCT/US2025/028170 International Search Report and Written Opinion mailed Jul. 29, 2025.

\* cited by examiner

SYSTEMS AND METHODS OF DYNAMIC LIGHTING EFFECTS

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The subject matter disclosed herein relates to the field of visual guest experiences. More specifically, embodiments of the present disclosure relate to systems and methods for a lighting system.

Various amusement rides, exhibits, and demonstrations have been created to provide guests with unique interactive, motion, and visual experiences. Such experiences may be designed to provide enhancement to everyday activities to create a fantastical environment. In various rides and exhibits, guest experiences may be enhanced by employing certain interactive visual features within the rides and exhibits. However, some interactive visual features, such as customized lighting, may be costly and ill-suited for incorporation into visual experiences.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a lighting system includes a central support structure, one or more adjustable arms coupled to the central support structure. The one or more adjustable arms are configured to transition between a retracted position and an extended position. The lighting system also includes a plurality of light sources disposed along the one or more adjustable arms.

In an embodiment, a method of lighting a themed element with a lighting system from within an internal volume of the themed element includes activating one or more adjustable arms of the lighting system to transition between a retracted position and an extended position such that a plurality of light sources disposed on the adjustable arms are transitioned toward boundaries of the internal volume. The method also includes activating the plurality of light sources disposed on the one or more adjustable arms.

In an embodiment, a lighting system includes a central support structure, and one or more adjustable arms coupled to the central support structure. The one or more adjustable arms are configured to transition between a retracted position and an extended position. A plurality of light sources is disposed along the one or more adjustable arms. The lighting system also includes a controller, configured to control a position of the one or more adjustable arms, and a processing system of the controller is configured to activate one or more portions of the plurality of light sources.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that, in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A themed environment may enhance a guest experience in an attraction, such as a theatre, ride, restaurant, or the like. Themed environments may be established, at least in part, using visual effects to provide immersive guests experiences. For example, visual effects may include controlling lighting of one or more themed elements (e.g., structures, objects) to generate immersive guest environments with consistent lighting and/or dynamic lighting effects. Themed elements used to generate lighting effects may have different shapes, forms, and sizes to generate desired visual effects. As such, custom design and fabrication of lighting rigs has traditionally been used to illuminate (e.g., light) the themed elements instead of conventional lighting rigs (e.g., lighting panels, spotlights, lighting trusses, and the like) due to customization of the themed elements' shapes, forms, and sizes. However, it is now recognized that custom design and fabrication is expensive and time-consuming. In some cases, designing and fabricating lighting rigs that provide even illumination and dynamic lighting control involve extensive customization. Such extensive customization of lighting rigs is cumbersome, may limit production speed, increases weight of the themed elements (e.g., increasing assembly time), and may limit scalability. Further, it is now recognized that themed elements may have one or more boundaries (e.g., edges) at more than one plane and conventional lighting rigs generally do not provide sufficient lumen output for even illumination (e.g., consistent illumination) of such themed elements at the boundaries. Techniques for providing the effects of custom-designed lighting rigs (e.g., even illumination and dynamic lighting control to establish a themed environment) without the associated expense and inefficiency are desired. Thus, present embodiments are directed to a newly recognized need for scalable, at least partially dynamic, and less burdensome customization of lighting rigs.

Provided herein is a dynamic lighting system that facilitates generating lighting effects through illumination of one or more themed elements and adjustment to accommodate any of a variety of such themed elements. The lighting system may illuminate (e.g., consistent illumination, dynamic illumination, even illumination, diffuse illumination, structured illumination) the themed elements to enhance guest experiences, create lighting effects, and/or establish illumination within an immersive environment. In an embodiment, the lighting system includes a central support structure, one or more adjustable arms, and a plurality of lights. The plurality of lights are disposed on one or more surfaces of the adjustable arms. In some embodiments, the lighting system may be inserted into the themed element. Further, the lighting system may be activated to transition between a retracted position and an extended position. The retracted position may position the adjustable arms parallel and proximate to the central support structure. The extended position may position the adjustable arms expanded and/or extended from the central support structure to provide light (e.g., position light(s)) towards the boundaries of the themed element. In this manner, effective customization of lighting of themed elements may be controlled by varying the position of the adjustable arms without the time and inefficiency associated with traditional customization. That is, the adjustable arms may be used to illuminate themed elements of various shapes, sizes, and forms. For example, the themed element may have a port (e.g., an opening) on a surface of the themed element that the lighting system may be inserted while into in the retracted position. The lighting system may be controlled via a control system or an actuator (e.g., configured to be actuated manually and/or in response to insertion into the themed element) to transition between the retracted position and the extended position to internally illuminate the themed element. In this manner, control of the adjustable arms may allow for control of illumination at the boundaries of the themed element. Accordingly, consistent illumination of a variety of different themed elements may be achieved using a standardized lighting system, in accordance with an embodiment of the present disclosure.

In an embodiment, the lighting system is configured to dynamically position the light sources proximate to a surface (e.g., boundary, edge) of the themed element. In this manner, a lumen output of the light sources may provide illumination of the themed element. That is, by positioning the light sources in proximity (e.g., within thirty centimeters, within 15 centimeters) to the surface of the themed element, the lumen output (e.g., light intensity) of the light sources may be controlled without over-heating of the lighting system and/or the themed element. In this manner, the light system may include traditional LED technology, thermal management systems (e.g., heat sinks), and the like.

In an embodiment, the adjustable arms of the lighting system may provide a skeletal lighting structure to minimize a footprint and/or a weight of the lighting system. In this manner, the lighting system may provide space for additional components within the themed element. For example, additional components may include various effects generators, monitoring features, compliance components, and so forth (e.g., sprinkler systems, cameras, sensors, fog generators). These additional components may facilitate compliance with certain protocols for the environment (e.g., a requirement to monitor certain areas with a camera). Additionally and/or alternatively, the skeletal lighting structure may allow the light sources to be incorporated within various themed elements of the themed environment without addition of substantial weight as compared to conventional lighting rigs.

In an embodiment, the lighting system may generate dynamic lighting effects. This may not only be achieved by adjusting light activation (e.g., controlling the type or location of light being emitted), but via physical actuation. For example, the lighting system may control a position of the plurality of lights disposed on the adjustable arms and/or a position of the adjustable arms. In some embodiments, the lighting system may provide dynamic lighting effects through modulation of one or more components of the lighting system within the themed element. For example, the themed environment may provide an immersive experience such as generating an event to mimic a thunderstorm, thereby enhancing guest experiences. In this manner, the lighting system may dynamically change the lumen output of the light sources and/or the position of the light sources within the themed element to replicate lighting in an oblong shape. That is, the light sources may be controlled to turn off, turn on, flash, move in position, or a combination thereof to replicate lightening in the thunderstorm. Further, the adjustable arms may be controlled via the control system to modulate lighting effects of the lighting system.

Figure 1:
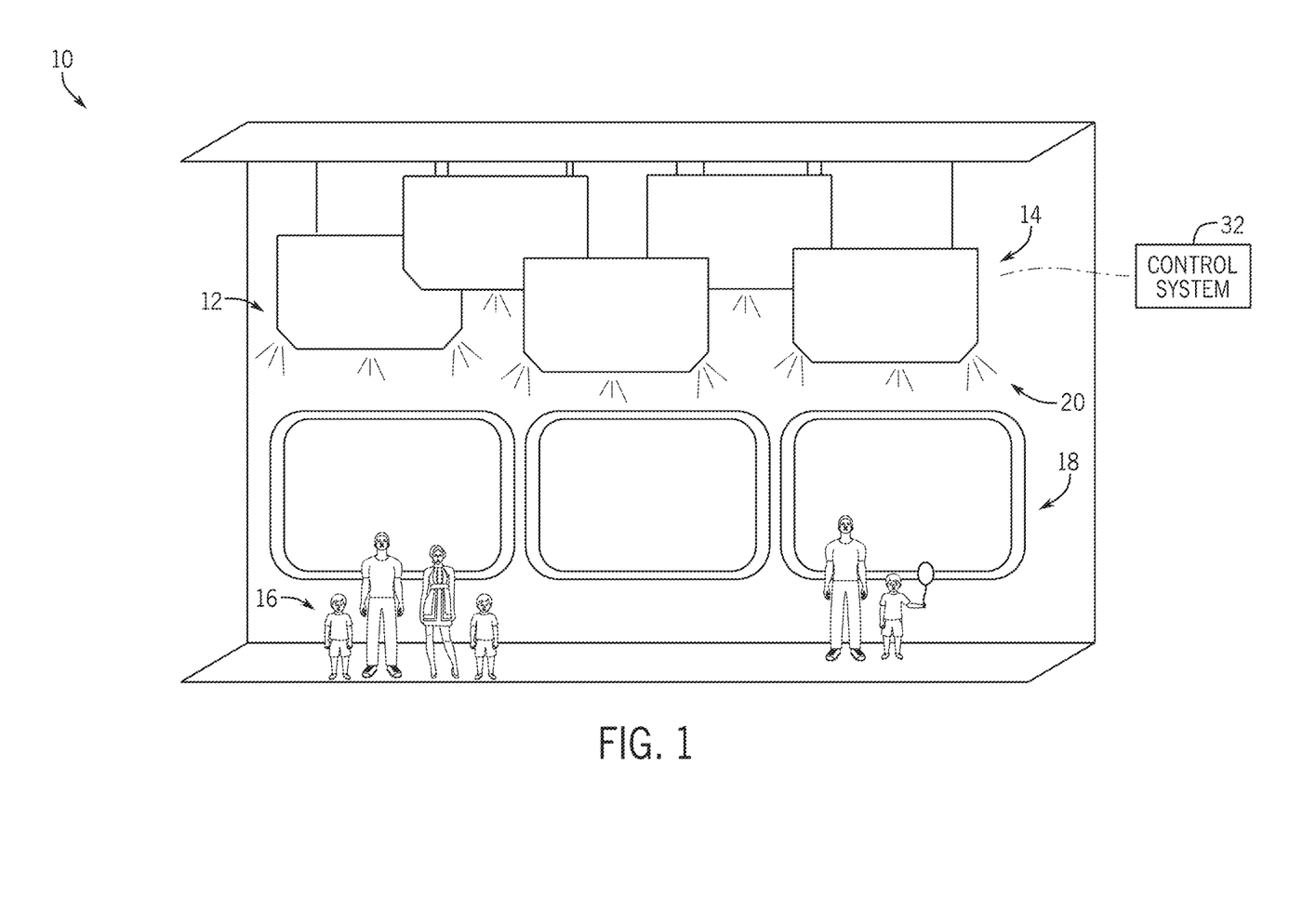
FIG. 1 is a schematic perspective view of a themed environment including a lighting system, in accordance with an embodiment or the present disclosure.

FIG. 1 is a schematic perspective view of a themed environment 10 (e.g., an amusement park) including a lighting system 12, in accordance with an embodiment of the present disclosure. It should be understood that the themed environment 10 is by way of example, and other contexts for use in conjunction with the lighting system 12 are also contemplated. The themed environment 10 may be part of an amusement park or other narrative experience that facilitates guest interaction through the inclusion of visual experiences. The themed environment 10 may be part of a retail experience, an attraction experience, an educational experience, a tourism experience, a dining experience, etc. The themed environment 10 includes the lighting system 12 and one or more themed elements 14. The lighting system 12 may be used to generate lighting effects within the themed elements 14. In accordance with present embodiments, a themed element may include a structure or vessel with an internal volume in which the lighting system 12 may be disposed. For example, a themed element 14 may include a vessel shaped like a cloud, flower, rainbow, character head, and the like, and may include an opening (e.g., a port into the internal volume) for receiving the lighting system 12 (e.g., while the lighting system 12 is in a compact or retracted configuration).

In the illustrated example, the lighting system 12 may illuminate a viewing area 18. The viewing area 18 may include various elements to enhance experiences of one or more guests 16 (e.g., a user). As such, the lighting system 12 may illuminate the themed elements 14 to generate lighting effects 20 (e.g., visual effects). In some embodiments, the lighting effects 20 may include generation of ambient lighting (e.g., light evenly filling the viewing area 18), dynamic lighting (e.g., controlled lighting effects), task lighting (e.g., lighting used to illuminate specific regions of the viewing area 18), accent lighting (e.g., lighting used to illuminate specific features of the themed environment 10), and the like. The lighting system 12 may enhance the immersive experience of the guests 16 within the themed environment 10.

In an embodiment, the lighting system 12 may be used to generate a consistent lighting effect within the viewing area 18. The consistent lighting effect may be tailored to generate immersive guest experiences to indicate to the guests 16 they are in a particular area of the themed environment 10. For example, the themed environment 10 may include one or more different areas (e.g., themed lands, themed attractions) and lighting of a particular area of the themed environment 10 may be used to signal to the guests 16 that they are within the particular portion of the themed environment 10. For example, the guests 16 may be in a space themed environment and the lighting system 12 may generate lighting effects 20 of being onboard of a space craft. Additionally and/or alternatively, the lighting system 12 may dynamically change based on a narrative experience of the particular portion of the themed environment 10. For example, as the narrative experience may suggest a breakdown of the space craft, the lighting system 12 may generate lighting effects 20 to simulate failure of the space craft. In some instances, a portion of light sources (e.g., LEDs of the lighting system 12) may be controlled by a control system 32. For example, a first portion of the light sources (e.g., light sources 52 in FIG. 2) may blink. In some instances, a second portion of the light sources may be set to an "OFF" state. Further, in some instances the lighting system 12 may generate lighting effects 20 to create the visual effects similar to being in space. As such, the lighting system 12 may control the lighting effects 20 to generate diffuse light to add to the narrative experience of the guests 16.

Figure 2:
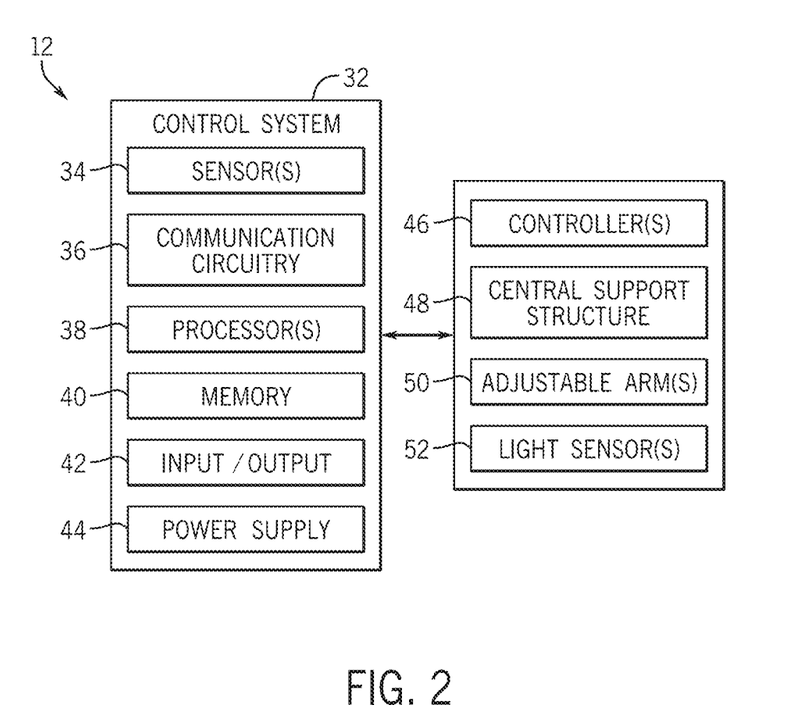
FIG. 2 is a block diagram of a lighting system implemented to generate lighting effects in an environment, in accordance with an embodiment of the present disclosure.

FIG. 2 is a block diagram of the lighting system 12 in accordance with an embodiment of the present disclosure. As previously discussed, the lighting system may be implemented to generate lighting effects 20 (FIG. 1) in an environment. The lighting system 12 may include the control system 32. The control system 32 may include one or more sensor(s) 34, communication circuitry 36, one or more processor(s) 38 (e.g., processing system), memory 40 (e.g., one or more memory circuits), an input/output (I/O) port 42, a power supply 44 (e.g., wired power, a battery) and the like. The control system 32 may receive sensor data from the sensor(s) 34 (e.g., position sensor, tracking sensor, cameras, lasers, infrared sensor, etc.) to activate the lighting system 12. The lighting system 12 may include one or more controller(s) 46, a central support structure 48, one or more adjustable arm(s) 50, one or more light source(s) 52, or a combination thereof. In some instances, the lighting system 12 and the control system 32 may be communicatively coupled. In this manner, the control system 32 may provide instructions to the controller(s) 46 of the lighting system 12 to control the adjustable arm(s) 50 and/or the light source(s) 52 (e.g., LEDs, LED strip, multiple LED strips, laser(s), etc.).

In an embodiment, the adjustable arms 50 may be coupled to at least one end of the central support structure 48. In some instances, the adjustable arms 50 may be coupled to an additional end of the central support structure and/or positioned within a cavity of the central support structure. The central support structure 48 may be a beam (e.g., an aluminum beam, a steal beam, a plastic beam, or the like). The central support structure 48 may include a base, a mount, or a combination thereof. The base and/or the mount may be positioned at or form the at least one end of the central support structure 48. In some instances, the base may support (e.g., brace, provide balance to) the central support structure 48 positioned on a surface of a floor, a ceiling, and/or the themed element 14 (FIG. 1). Additionally and/or alternatively the mount may be coupled to at least one end of the central support structure 48. In this manner, the mount may be used to rig (e.g., install) the lighting system 12 on the surface of the floor, the ceiling, and/or the themed element 14. The central support structure 48 may provide various rigging (e.g., installation, arrangement, setup, attachment) configurations that may facilitate adapting the lighting system 12 for use in various environments (e.g., various themed elements, various themed environments).

In an embodiment, the light sources 52 may be disposed (e.g., positioned, arranged, displayed) on one or more surfaces of the adjustable arms 50. The one or more adjustable arms 50 may be made of a material (e.g., silicon, rubber, polyamide, polyethene, Teflon, polyvinyl chloride, bendable metals, and the like) that may be adjustable (e.g., bendable, flexible, pliable). The material may allow the adjustable arms 50 to be positioned (e.g., moved, expanded, bent) to one or more positions. In some instances, the adjustable arms 50 may include one or more segments that may be bent and/or shaped in one or more directions. For example, the adjustable arms 50 may include one segment that may be made of a flexible material enabling the adjustable arms 50 to be bent to one or more angles. In this manner, the adjustable arms 50 may provide fluid positioning (e.g., via linear motion) of the adjustable arm 50. Additionally and/or alternatively, the adjustable arms 50 may include a plurality of segments with one or more joints to allow the adjustable arms 50 to be moved (e.g., via jointed motion) to various positions. For example, the adjustable arms may include multiple ball and joint segments. In this manner, adjustable arms including a segment (e.g., flexible material) and/or multiple segments (e.g., jointed segments) may be used to control the positions and/or one or more angles (e.g., right angle, obtuse angle, acute angle) of the light sources 52 relative to the central support structure 48.

In an embodiment, the adjustable arms 50 may be externally controlled via the control system 32. For example, the control system 32 may provide instructions to the controller(s) 46. The controller(s) 46 may be used to control actuation of the lighting system 12. For example, the controller(s) 46 may adjust each of the adjustable arms 50 individually (e.g., sequentially) to one or more positions. In this manner, each adjustable arm of the adjustable arms 50 may be positioned to a specific position. In some instances, the adjustable arms 50 may be controlled simultaneously. The adjustable arms may move to one or more positions based on one or more boundaries. The boundaries may include predetermined boundaries (e.g., preprogrammed boundaries) and/or boundaries sensed by the sensor(s) 34 of the control system 32.

In an embodiment, the adjustable arms 50 may be made of a light emitting diode (LED) strip, an organic light emitting diode (OLED), and the like. In this manner, the adjustable arms 50 may act as the light sources 52. As such, the adjustable arms 50 may form a continuous light source. For example, the adjustable arms 50 may be made of a bendable OLED screen. In some embodiments, the control system 32 may send instructions to the controller 46 to provide illumination (e.g., uni-directional illumination, multi-directional illumination) via the bendable OLED screen. In certain embodiments, the adjustable arms may be made of the LED strip. The light sources 52 may be disposed within a casing (e.g., tubing, optic cable, optic fiber) to provide illumination along a length of the adjustable arms 50. As such, illumination from the LED strip may be provided at various angles controlled based on the position of the adjustable arms 50.

In an embodiment, the adjustable arms 50 may provide one or more surfaces to couple to the light sources 52. The surfaces may include a top surface, a bottom surface, one or more side surfaces, or a combination thereof of the adjustable arms 50. In some instances, the adjustable arms 50 may include one or more light fittings (e.g., light sockets, Edison socket, bayonet socket, pin sockets, wedge sockets, and the like). The light fittings may be used to couple the light sources 52 to the one or more adjustable arms 50. In this manner, the light sources 52 coupled to the adjustable arms 50 may be replaceable and one or more of the light sources 52 may receive maintenance (e.g., replace one or more bulbs) to extend a lifetime of the lighting system 12.

In an embodiment, the light sources 52 are disposed (e.g., positioned, arranged, fitted) on the one or more surfaces of the adjustable arms 50. For example, the light sources 52 may be positioned on the top surface, the bottom surface, and/or the side surfaces of the adjustable arms. In this manner, the light sources 52 may provide multi-directional illumination (e.g., with respect to the adjustable arms 50) by generating light from multiple surfaces of the adjustable arms 50. The light sources 52 may include LEDs (e.g., chip on board LED, LED bulbs, surface mounted diode LEDs, dual in-line package LEDs, etc.), halogen incandescent lights, compact fluorescent lights, and the like. The light sources 52 may be connected to a power source (e.g., the one or more light fittings on the adjustable arms 50, one or more external power supplies). In some embodiments, the controllers 46 may control power provided to the light sources 52. For example, the controllers 46 may transition the light sources 52 from an "OFF" state (e.g., no power, lights off) to an "ON" state (e.g., powered, lights on). In some embodiments, the controllers 46 may dim the lights (e.g., change lumen output).

In an embodiment, the light sources 52 may transition between the "OFF" state and the "ON" state of the lighting system 12. The control system 32 may provide power to the light sources 52 in the "ON" state and, in some instances, the control system 32 may limit power to the lighting system 12 in the "OFF" state. For example, in some embodiments, the lighting system 12 may be in the "OFF" state during installation. In some embodiments, the lighting system 12 may transition between a retracted position and an extended position. The retracted position may position the adjustable arms 50 substantially parallel to the central support structure 48. In this manner, the retracted position of the lighting system 12 may limit movement of the adjustable arms 50 and/or the light sources 52. For example, the lighting system 12 may be in the retracted position and/or in the "OFF" state during installation of the lighting system 12. In some embodiments, the lighting system 12 may include one or more fasteners to physically couple the adjustable arms 50 to the central support structure 48. The adjustable arms 50 may be mechanically controlled by the control system 32 to move to the retracted position. It should be noted that the lighting system 12 may be in the "ON" state and/or the "OFF" state in the retracted position. That is, power may be provided to the light sources 52 of the lighting system 12 when the adjustable arms 50 are positioned along the central support structure 48.

In an embodiment, the lighting system 12 may be transitioned between the retracted position to the extended position. The extended position may allow movement of the adjustable arms 50. The adjustable arms 50 may be expanded from a first end of the central support structure 48. For example, the adjustable arms 50 may form one or more angles (e.g., right angle, acute angle, obtuse angle) relative to the central support structure 48. In some embodiments, the adjustable arms 50 may move towards the first end of the central support structure 48 from a second end of the central support structure. Such movement may cause the adjustable arms 50 to curve outwards relative to the central support structure 48. In this way, the adjustable arms 50 may form an elliptical shape (e.g., oval shape, spherical shape) around the central support structure 48.

In an embodiment, the central support structure 48 may be flexible. In this manner, the central support structure 48 may be made of flexible material (e.g., silica, plastic, rubber, and the like). The central support structure 48 may include a steering assembly. The steering assembly may be used to mechanically position the central support structure 48 of the lighting system 12. The steering assembly may include steering wires, steering wheel, actuators, pinion gears, and the like. The steering assembly may be used to steer the central support structure 48. In this manner, the central support structure 48 of the lighting system 12 may be controlled by the control system 32, or manually, to position the adjustable arms 50 in the retracted position and/or the extended position.

In an embodiment, the controllers 46 may be used to transition the light system 12 between the retracted position and the extended position. For example, the lighting system 12 may be installed in the retracted position and transitioned to the extended position during operation. The light sources 52 may be controlled by the control system 32 to transition between the "ON" state and the "OFF" state during operation. In this manner, the controllers 46 may control the lighting effects 20 (FIG. 1) provided by the lighting system 12. As such, the lighting system 12 may provide dynamic lighting and/or illumination of themed elements and/or other components of the themed environment 10. In some instances, the light sources 52 may include one or more adjustable features (e.g., color change, dimmable, strobe effects, vary voltage, vary current, turn off and on) to provide dynamic lighting effects. In this manner, the adjustable features may be used to generate immersive lighting effects to enhance guest experiences. In certain embodiments, a portion of the light sources 52 may be controlled by the control system 32. The light sources 52 may be controlled individually. That is, each of the light sources 52 may be independently controlled by the control system 32. In some instances, portions or groupings (two light sources, four light sources, ten light sources, twelve light sources, twenty light sources) of the light sources 52 may be controlled by the control system 32. The light sources 52 of the lighting system 12 may be used to generate dynamic lighting effects.

In an embodiment, the control system 32 controls the lighting system 12 to transition between the retracted position and the extended position. Accordingly, the lighting system 12 may be rigged (e.g., fitted, installed) into components of the themed environment 10 (FIG. 1) to illuminate the themed environment via ambient lighting, accent lighting, task lighting, and the like. Specifically, for example, the lighting system 12 may be positioned within the themed elements 14 in the retracted position. The adjustable arms 50 of the lighting system 12 may be coupled to the central support structure 48 at a first end and a second end of the central support structure 48 in the retracted position. In some instances, the adjustable arms 50 may be positioned within a cavity of the central support structure 48 in the retracted position. Positioning of the adjustable arms 50 along and/or within the central support structure 48 in the retracted position may allow the lighting system 12 to be inserted within a port (e.g., an opening) of the themed elements 14, wherein the port is not sufficiently sized to receive the adjustable arms 50 in the expanded position. In this manner, the lighting system 12 may be incorporated in use of themed elements of various sizes, shapes, and forms.

In an embodiment, the one or more sensors 34 of the control system 32 are used to sense a position of the adjustable arms 50. The sensors 34 may be positioned on one or more portions of the lighting system 12, themed elements 14, and/or additional components of the themed environment 10. The sensors 34 may be used to sense the presence and/or the position of the adjustable arms 50 in relation to one or more surfaces of the themed element 14 and generate sensor data. As such, the sensors 34 may provide sensor feedback data as the control system 32 provides instructions to the lighting system 12 to transition between the retracted position and the extended position. In some embodiments, the one or more sensors 34 include one or more cameras. The one or more cameras may include various cameras (e.g., complementary metal-oxide-semiconductor, charge coupled device), and may be positioned on or within the lighting system 12 and/or the themed elements 14. The cameras may be used to provide sensor data indicative of the position of the adjustable arms 50 within the themed elements 14. The sensor data (e.g., position data, image data) may be provided to the processor 38 of the control system 32. The processor 38 may then transmit signals to the lighting system 12 to control the position of the adjustable arms 50 based on the sensor data. In some cases, the adjustable arms 50 may transition to the extended position and may be secured into a static position. Each of the adjustable arms 50 may be individually actuatable. In accordance with an embodiment of the present disclosure, we may allow for accommodation of non-uniform geometries of certain themed elements 14. The lighting system 12 may illuminate the themed element 14 in the static position. The themed element 14 may be illuminated at one or more boundaries (e.g., edges, surfaces) to create a desired lighting effect as the adjustable arms 50 are in the static position. For example, the adjustable arms 50 may be secured in the static position based on a threshold distance between the adjustable arm 50 and the boundaries of the themed element 14. In this manner, the control system 32 activates movement (e.g., adjustment) of the lighting system 12 based on position data extracted from the sensor data. In other cases, the position data may prompt the lighting system 12 to remain inactive. Further, in some embodiments, the position data and/or the boundaries of the themed element 14 may be predetermined (e.g., preprogrammed). The sensors 34 may provide sensor data based on the predetermined position data indicative of approaching the boundaries of the themed elements 14. It should be noted, that in some instances, the lighting system 12 may be manually transitioned between the retracted position and the extended position. As such, in an embodiment, the lighting system 12 may have no sensors positioned on the adjustable arms 50.

In some embodiments, the one or more sensors 34 may include one or more temperature sensors. In this manner, the temperature sensors may be used to monitor heat generation of the lighting system 12. As such, sensor data (e.g., current temperature, temperature changes) may be used to determine if one or more heat sinks may be used within the lighting system 12. In some instances, the sensor data may indicate that the lighting system 12 may need to be transitioned to the "OFF" state to prevent overheating. Additionally and/or alternatively, the sensor data may provide information based on the lifetime of the light sources 52 of the lighting system 12. In this way, the sensor data may be used to determine if one or more of the light sources 52 may need maintenance (e.g., replaced, removed). Further, temperature data may indirectly provide data indicative of relative location. For example, close proximity of a particular one of the light sources 52 to an internal boundary of the themed element 14 may cause heat to accumulate proximate the particular light source, which can be detected by a corresponding temperature sensor. Such data may be used in the place of position data to facilitate desired positioning of the light sources 52.

The communication circuitry 36 may facilitate wired or wireless communication between various components of the control system 32 as well as with external devices, such the controllers 46, one or more additional components of the lighting system 12, or controllers (central or local) of a larger system (e.g., amusement park, attraction, immersive experience). The processor 38 may be any suitable type of computer processor or microprocessor capable of executing computer-executable code. Moreover, the processor 38 may include multiple microprocessors, one or more "general-purpose" microprocessors, one or more special-purpose microprocessors, and/or one or more application specific integrated circuits (ASICs), or some combination thereof. For example, the processor 38 may include one or more than one reduced instruction set computer (RISC) or complex instruction set computer (CISC) processors. In some embodiments, the processor 38 may receive inputs transmitted from the sensors 34, and/or additional components of the lighting system 12, and communicate with the lighting system 12 using the communication circuitry 36. For example, during installation of the lighting system 12, the sensors 34 may detect that a particular adjustable arm is approaching a particular boundary of the themed element 14. The boundary (e.g., known position) may be based on one or more data sets associated with installation of the lighting system 12. The one or more data sets may be accessible by the processor 38. As such, the control system 32 may receive a signal indicating that the particular adjustable arm is approaching the particular boundary of the themed element 14. As such, the control system 32 may change movement of the particular adjustable arm to prevent the particular adjustable arm from meeting and/or crossing the particular boundary of the themed element 14. In some instances, the control system 32 may control the lighting system 12 to activate the lighting effects 20 based on an input from the processor 38.

The memory 40 of the control system 32 may also be used to store the data, the sensor data, various other software applications, and the like that are executed by the processor 38. The memory 40 may represent non-transitory computer-readable media (e.g., any suitable form of memory or storage) that may store the processor-executable code used by the processor 38 to perform various techniques described herein. The input/output (I/O) ports 42 may be interfaces that may couple to other peripheral components such as input devices (e.g., keyboard, mouse), sensors, I/O modules, and the like. The power supply 44 may provide power to one or more components of the control system 32. The components of the control system 32 and/or the lighting system 12 may be integrated within the themed environment 10. As such, the control system 32 may be concealed at least in part from view of the guests 16.

FIG. 3-7 are examples of embodiments of the lighting system 12, control system 32, the themed elements 14, and individual components thereof. It should be understood that the disclosed embodiments may include all or some of components disclosed in the lighting system 12 of FIG. 2.

Figure 3:
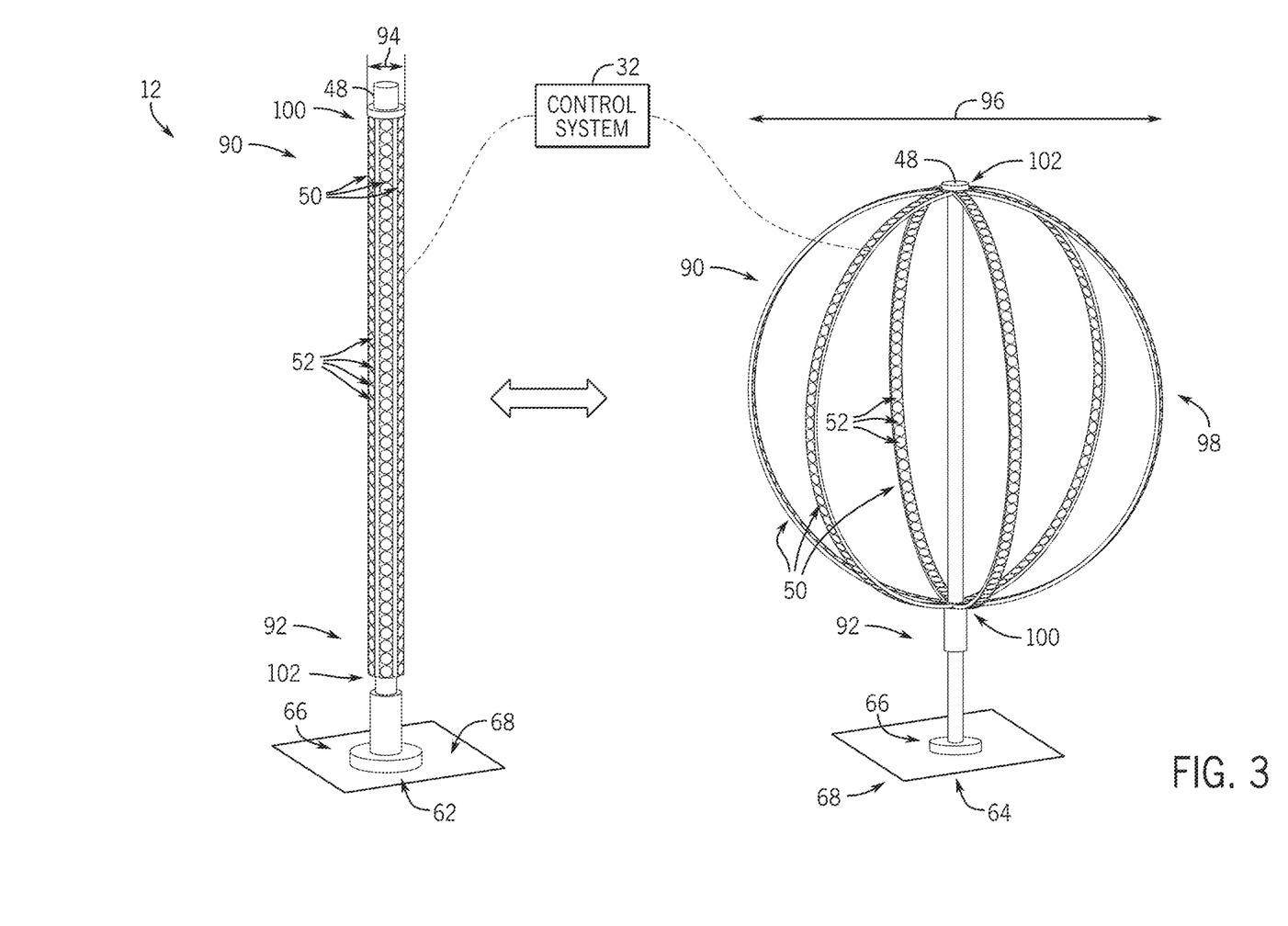
FIG. 3 is a schematic perspective view of a lighting system transitioning between a retracted position and an extended position, in accordance with an embodiment of the present disclosure.

FIG. 3 is a schematic illustration of a lighting system transitioning between a retracted position 62 and an extended position 64. As illustrated, the lighting system 12 includes a central support structure 48, one or more adjustable arms 50, and a plurality of light sources 52. The central support structure 48 may include a base 66. The base 66 may provide support (e.g., brace, provide balance) to the central support structure 48 positioned on a surface 68 (e.g., a floor, a ceiling, the themed element 14). The control system 32 may control the lighting system 12 during transition from the retracted position 62 to the extended position 64. In some instances, the adjustable arms 50 may be coupled (e.g., fixedly coupled) to a first end 90 of the central support structure 48. Additionally and/or alternatively, the adjustable arms 50 may be coupled (e.g., slidably coupled) to a second end 92 of the central support structure 48. As shown, the adjustable arms 50 may be positioned substantially parallel to the central support structure 48 in the retracted position 62. The light sources 52 may be inactive in the retracted position 62. As shown, a retracted width 94 of the lighting system 12 may be reduced as compared to an extended width 96 of the lighting system 12 in the extended position 64. That is, the extended width 96 may control the adjustable arms 50 to fill a volume surrounding the central support structure 48.

As illustrated, the lighting system 12 may form an oval shape and/or an elliptical shape in the extended position 64. It should be understood that more configurations of the extended position 64 are contemplated than are illustrated. In certain embodiments, the control system 32 may control movement of the adjustable arms 50 to the extended position 64. In one embodiment, a portion of the adjustable arms 50 coupled to the second end 92 of the central support structure 48 may move parallel to the central support structure 48 towards the first end 90 of the central support structure 48. In this manner, the adjustable arms 50 may form the elliptical shape as the lighting system 12 transitions from the retracted position 62 to the extended position 64. In another embodiment, a portion of the adjustable arms 50 coupled to the first end 90 may move toward the second end 92 or portions of the adjustable arms 50 coupled to both ends 90, 92 may move together to form the elliptical shape. For example, each of the adjustable arms 50 may form a curved surface 98. The curved surface 98 may be formed between the first end 90 and the second end 92 of the central support structure 48. In some embodiments, the control system 32 may control an extent of curvature of the curved surface 98. The extent of curvature of the curved surface 98 may be based on a distance between a first end 100 of the adjustable arms 50 and a second end 102 of the adjustable arms. In the illustrated embodiment, the distance between the first end 100 and the second end 102 of the adjustable arms 50 may be reduced in the extended position 64 (e.g., compared to the retracted position 62). In some embodiments, the control system 32 may control positioning of each adjustable arm of the adjustable arms 50 to a particular distance. As such, the distance between the first end 100 and the second end 102 may vary for each adjustable arm of the adjustable arms 50. In some instances, control of each of the adjustable arms may allow for customization of the lighting system 12. For example, locations of each of the adjustable arms 50 may be externally controlled.

Figure 4:
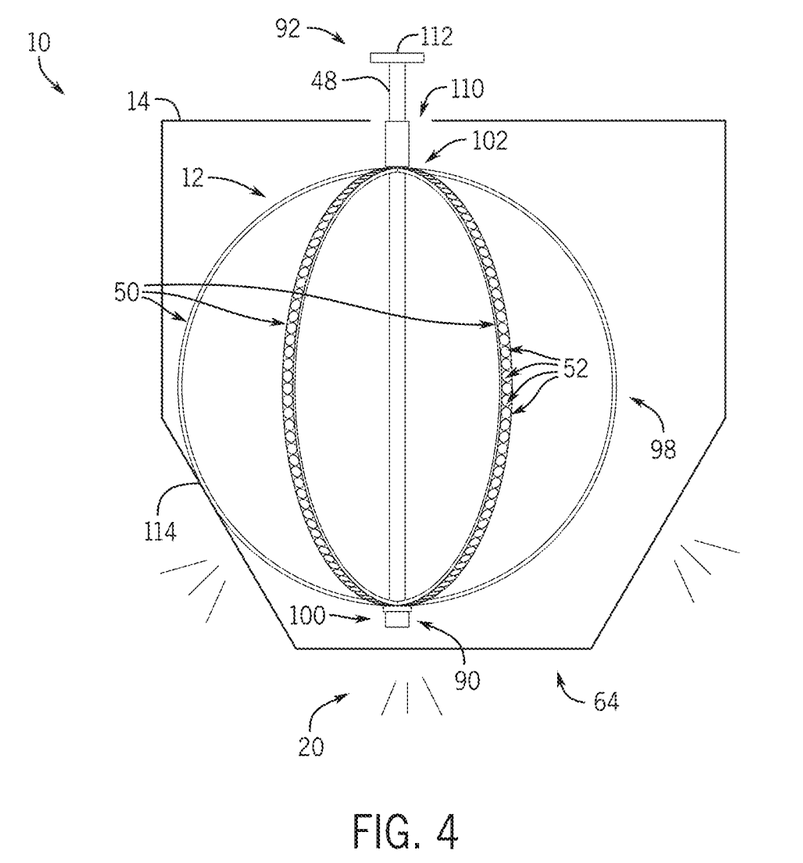
FIG. 4 is a sectional view of a portion of a themed environment including a lighting system positioned inside of an element, in accordance with an embodiment of the present disclosure.

With the foregoing in mind, in an embodiment, the lighting system 12 may be installed into the themed element 14 prior to transition between the retracted position 62 and the extended position 64. FIG. 4 is a sectional view of a portion of the themed environment 10 including a lighting system 12 positioned inside a themed element 14 in an extended position 64 of FIG. 3. In the illustrated embodiment, the themed element 14 is a depiction of an oblong shape. It should be noted that the oblong shape depiction is a non-limiting illustrative embodiment of the themed element 14, and one or more shapes, forms, sizes of the themed element 14 are envisioned with respect to the current disclosure.

In the illustrated embodiment, the lighting system 12 is in the extended position 64. It should be noted, that the lighting system 12 may be installed in the themed element 14 in the retracted position 62 of FIG. 3. Further, the lighting system 12 may be installed by positioning the lighting system 12 through a port 110 of the themed element 14. In this manner, the lighting system 12 may be used in combination with elements 14 of various sizes, shapes, and forms. The first end 90 of the central support structure 48 may be positioned proximate to a display end of the themed element 14 and, the second end 92 of the central support structure 48 may be positioned on a port side of the themed element 14. By transitioning from the retracted position 62 to the extended position 64, the light sources 52 of the lighting system 12 may be positioned proximate to the design end of the themed element 14 to provide lighting effects 20. The lighting system 12 may be coupled via a mount 112 to one or more surfaces (e.g., a ceiling, a rigging system). The mount 112 may provide support to couple the lighting system 12 to one or more additional components of the themed environment.

As illustrated, the lighting system 12 may be controlled by the control system 32 (FIG. 2) to actuate the adjustable arms 50 to the extended position 64. The themed element 14 may include one or more boundaries 114. In an embodiment, the control system 32 may actuate the adjustable arms 50 based on a predetermined position of the boundaries 114. More specifically, for example, the control system 32 may instruct actuation of the adjustable arms 50 into respective predetermined positions corresponding to the boundaries 114. In an embodiment, the adjustable arms 50 may extend from the central support structure 48 to form the elliptical shape. That is, each adjustable arm of the adjustable arms 50 may expand to one or more different predetermined positions based on a shape of the themed element 14. In an embodiment, the lighting system 12 may be physically (e.g., manually) transitioned between the retracted position 62 and the extended position 64. In this manner, in some instances, the control system 32 may be omitted from the lighting system 12.

Figure 5:
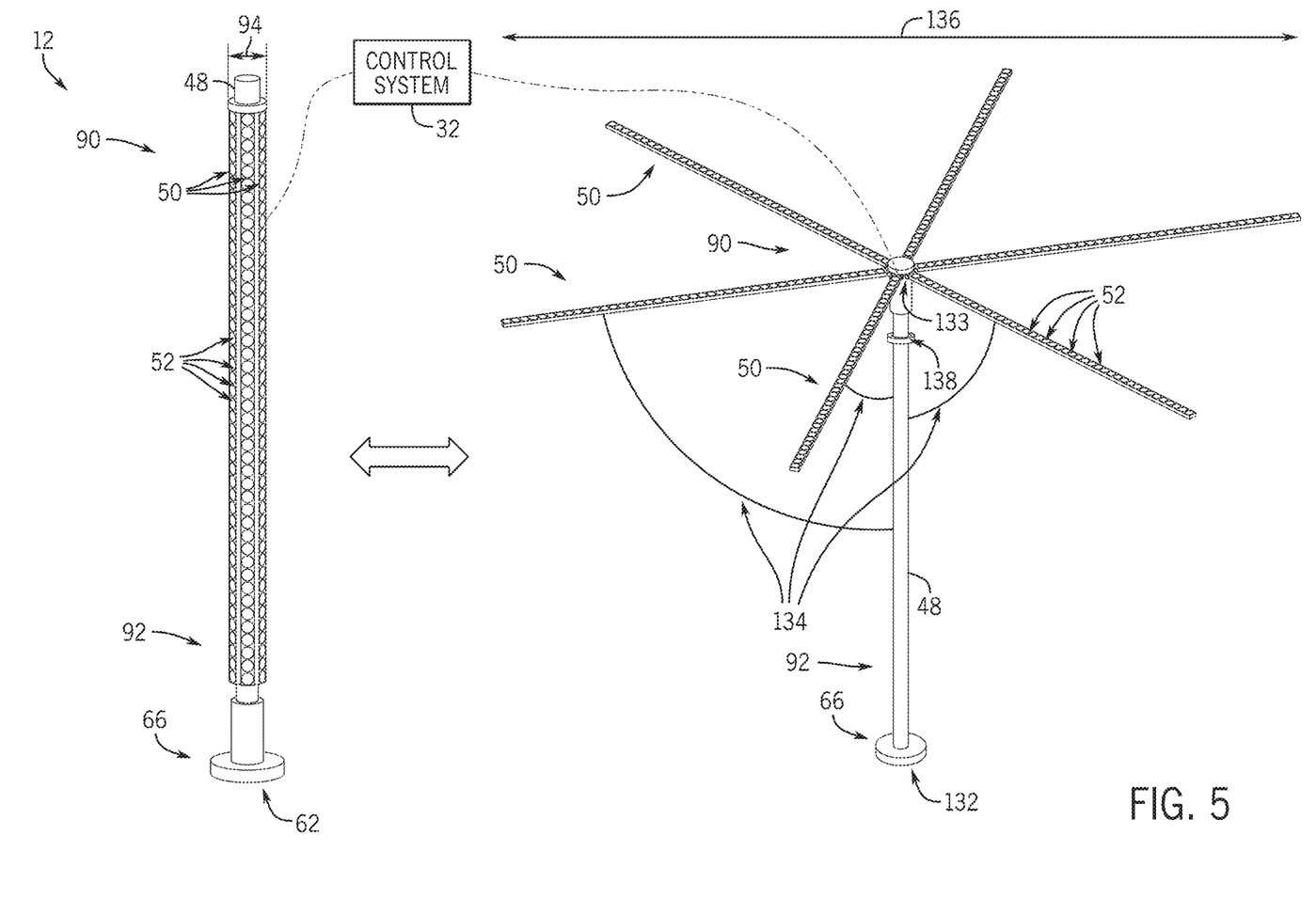
FIG. 5 is a perspective view of a lighting system transitioning between a retracted position and an extended position, in accordance with an embodiment of the present disclosure.

FIG. 5 is a schematic illustration of a lighting system 12 transitioning between the retracted position 62 and an extended position 132, in accordance with an embodiment of the present disclosure. The lighting system 12 may include the central support structure 48, the adjustable arms 50, the light sources 52, or a combination thereof. The central support structure 48 may include the base 66. The control system 32 may control the lighting system 12 during transition from the retracted position 62 to the extended position 132. In some instances, the adjustable arms 50 may be coupled (e.g., via hinges) to the first end 90 of the central support structure 48. As the lighting system 12 transitions from the retracted position 62 to the extended position 132, the adjustable arms 50 may rotate about hinges 133 to extend from the central support structure 48. As shown, the adjustable arms 50 may extend laterally from the central support structure 48. As such, the adjustable arms 50 may form one or more angles 134 (e.g., right angle, obtuse angle, acute angle) with respect to the central support structure 48. In this manner, the lighting system 12 may form a tree-like structure in the extend position 132. A width 136 of the lighting system 12 in the extended position 132 may be varied based on the angles 134 of the adjustable arms 50 and the central support structure 48. When the lighting system 12 is positioned within an element 14, this allows for light sources 52 to be positioned adjacent to different portions of a surface of varying internal volume of the themed element 14.

In an embodiment, the adjustable arms 50 may transition from the retracted position 62 to the extended position 132 through actuation of the adjustable arms 50. Actuation of the adjustable arms 50 may include electrical actuation, fluid driven actuation, mechanical actuation, manual (e.g., hand) actuation, external power tool actuation, or any combination thereof. In the illustrated embodiment, the adjustable arms 50 may be extended to the extended position 132 through actuation of a slider 138. The slider 138 may be manually slid parallel to the central support structure towards the first end 90 of the central support structure. The adjustable arms 50 may rotate about the hinges 133 to expand the one or more angles 134 with respect to the central support structure 48. It should be noted, that the slider 138 is a non-limiting example of actuation of the adjustable arms 50. In some embodiments, actuation of the adjustable arms 50 may be controlled via electrical actuation of the adjustable arms 50. For example, the hinges 133 may be actuators. For example, the hinges 133 may include one or more linear actuators, an electrified ball bearing hinge, or other suitable electrified hinges. The control system 32 may control actuation of the hinges 133 to position each adjustable arm of the adjustable arms 50 in a particular position to allow the light sources 52 to be positioned adjacent to different portions of the surface of varying internal volume of the themed element 14.

Figure 6:
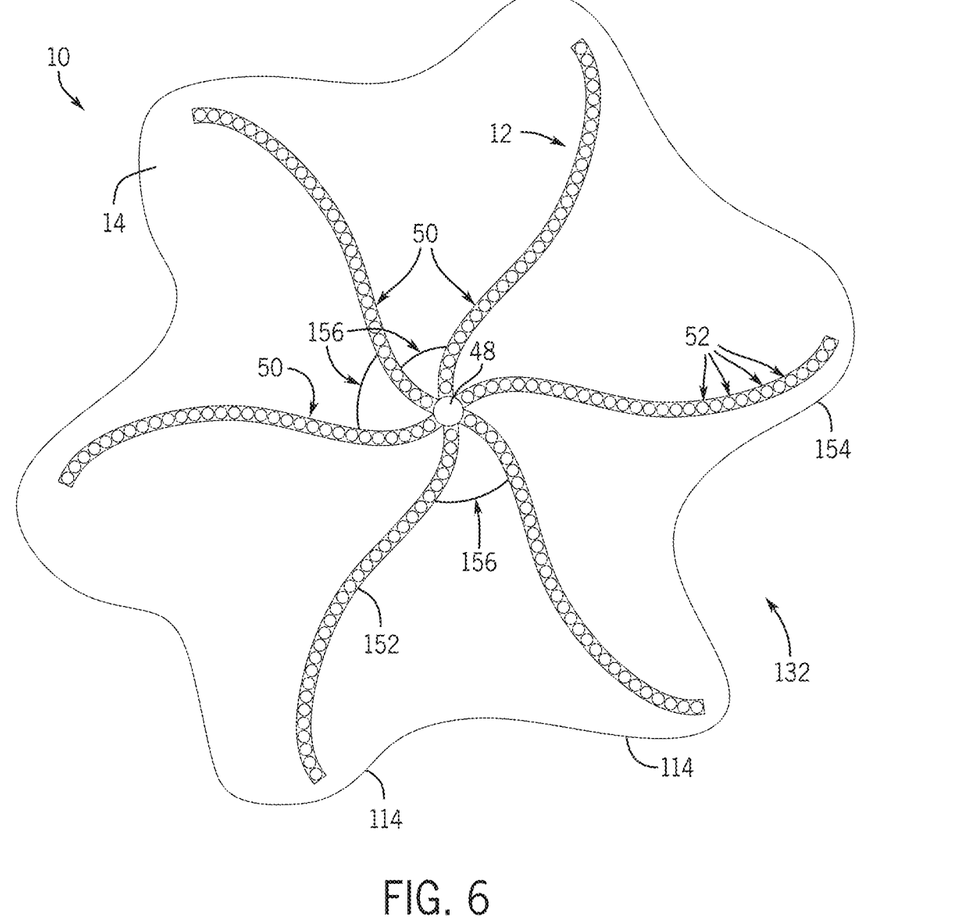
FIG. 6 is an overhead sectional view of a portion of a themed environment including the lighting system of FIG. 5 positioned inside an element, in accordance with an embodiment of the present disclosure.

FIG. 6 is a top sectional view of a portion of the themed environment 10 including the lighting system 12 of FIG. 5 positioned inside an element 14 in the extended position 132. The lighting system 12 may include the central support structure 48, the adjustable arms 50, and the light sources 52. In the illustrated embodiment, the adjustable arms may be shaped in a serpentine line 152 (e.g., curved line, sinuous line, circuitous line). In this manner, the adjustable arms 50 may be adjusted to fit (e.g., mirror, match) a shape 154 of the themed element 14. The adjustable arms 50 may be positioned near the boundaries 114 of the themed element 14 and flex to accommodate the geometry of the boundaries 114. Further, the light sources 52 may be positioned near the boundaries 114 of the themed element 14 to direct light through the themed element 14. This flexibility allows the lighting system 12 to be positioned in elements of various shapes (e.g., the shape 154, circular, rectangular, cylindrical, polygonal, irregular, and the like) and still achieve desired lighting characteristics.

In some instances, the sensors 34 (FIG. 2) of the control system 32 (FIG. 2) may position the adjustable arms 50 in proximity (e.g., adjacent, touching) to the boundaries 114. As such, the adjustable arms 50 may extend from the central support structure 48. The adjustable arms 50 may form one or more angles 156 between each adjacent adjustable arm, and the lighting system 12 may be customized to illuminate elements of various shapes. For example, in some embodiments, an element may include a themed character shape. The themed character may be illuminated by the light sources 52 (e.g., colored light) of the lighting system 12 to enhance guest experiences. As a specific example, the themed character may be an octopus. As such, the control system 32 may control the lighting system 12 to transition between the retracted position into the extended position. In the extended position each of the adjustable arms 50 may be positioned within a tentacle of the octopus. As such, each adjustable arm may be positioned at one or more planes of the element. Further, the adjustable arms 50 may be co-planar and/or non-co-planar with respect to boundaries of the element. Additionally, the control system 32 may independently adjust one or more conformations (e.g., angle, position) of the adjustable arms 50 to illuminate each tentacle of the octopus.

Figure 7:
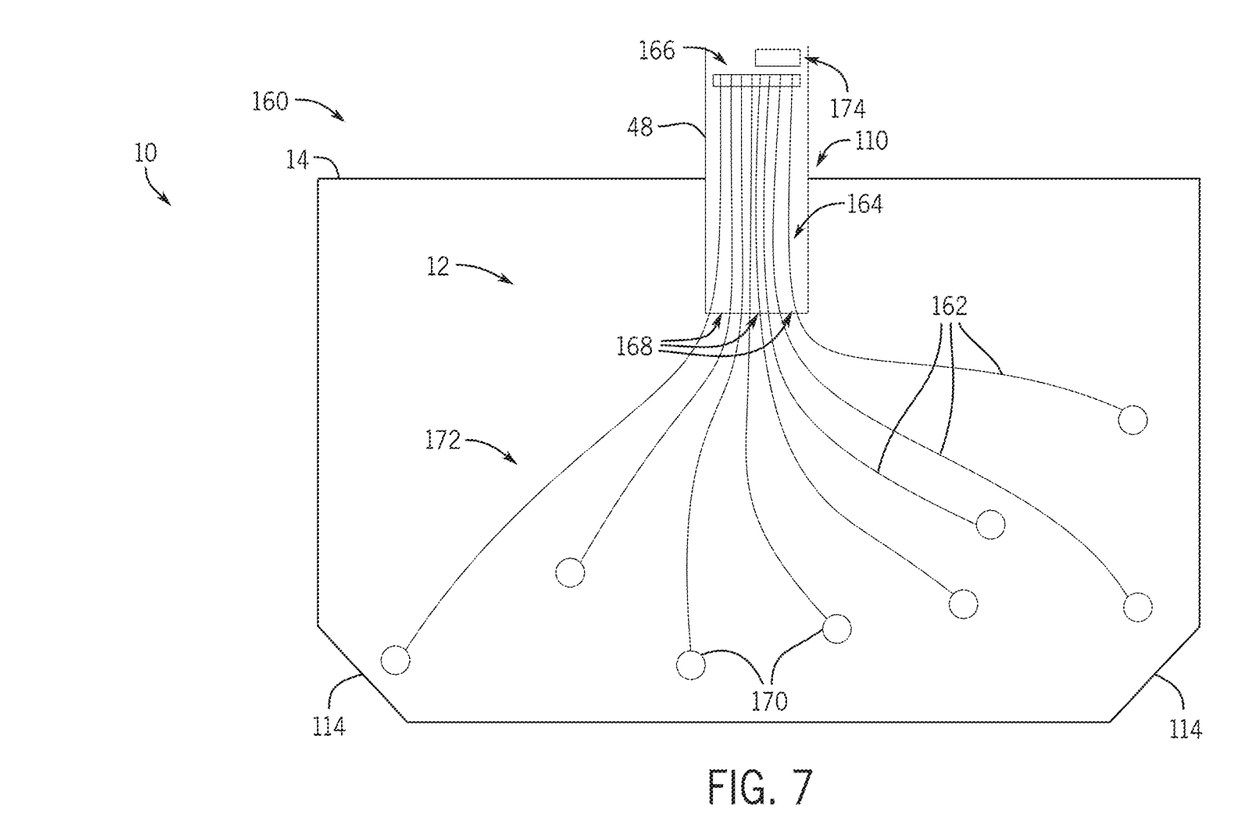
FIG. 7 is a schematic side view of a portion of the themed environment including an element and the lighting system, in accordance with an embodiment of the present disclosure.

FIG. 7 is a schematic illustration of a side view of an embodiment of a portion of the themed environment 10 including the themed element 14 and the lighting system 12. In the illustrated embodiment, the lighting system 12 is in an extended position 160. The lighting system may include one or more adjustable arms 162. The adjustable arms 162 may extend from a center bore 164 of the central support structure 48. In this manner, in the retracted position, not shown, the adjustable arms 162 may be wrapped around (e.g., coiled) a reel 166 (e.g., a bobbin, a spool). Alternatively, the adjustable arms 162 may be linearly actuated/transitioned. As the lighting system 12 transitions from the retracted position to the extended position 160, the adjustable arms 162 may extrude through one or more openings 168 of the central support structure 48. In this manner, the adjustable arms 162 may extend from the center bore 164 of the central support structure 48 into the themed element 14.

In an embodiment, the lighting system 12 may expand towards the boundaries 114 of the themed element 14 in the extended position 160. In some instances, the control system 32 (FIG. 2) may control extrusion of the adjustable arms 162 through the openings 168. The adjustable arms 162 may include one or more light sources 170 positioned on a display end 172 of the adjustable arms 162. The light sources 170 may be positioned at the boundaries 114 of the themed element 14 via extension of the adjustable arms 162 within the themed element 14. In some instances, the light sources 170 may contact the boundaries 114 of the themed element 14. As such, the adjustable arms 162 and the light sources 170 may be made of flexible material (e.g., silica, plastic, rubber, and the like). Accordingly, the adjustable arms 162 may bend when contacted with the boundaries 114 of the themed element 14. In some embodiments, the control system 32 may individually control a position of each of the adjustable arms 162. In this manner, the light sources 170 may be positioned at one or more desired positions within the themed element 14 and illuminate the themed element 14. Alternatively, the position of each of the adjustable arms 162 may be positioned manually. In some instances, the desired positions of the light sources 170 may change based on instructions received from the control system 32. As such, the lighting system 12 may dynamically illuminate the themed element 14 based on physical repositioning of the light sources 170. It should be noted that dynamic illumination may include changing positions of the adjustable arms 162 and/or the light sources 170 on one or more timescales (e.g., seconds, minutes, hours, and the like). The lighting system 12 may generate immersive guest experiences through illumination of elements 14 within the themed environment 10.

In an embodiment, a position of the central support structure 48 may be controlled by a steering assembly 174. The steering assembly 174 may include steering wires, steering wheel, actuators, pinion gears, and the like. The steering assembly 174 may be used to steer the central support structure 48 within the volume of the themed element 14. For example, the control system 32 may be used to control the steering assembly 174 to adjust a position of the central support structure 48. Alternatively, the steering assembly 174 may be controlled manually. The central support structure 48 may be moved within the themed element 14 to position the adjustable arms 162 towards the boundaries 114 of the themed element 14. As such, the steering assembly 174 may be controlled to change the position of the adjustable arms 162 in the retracted position and/or the extended position 160.

Figure 8:
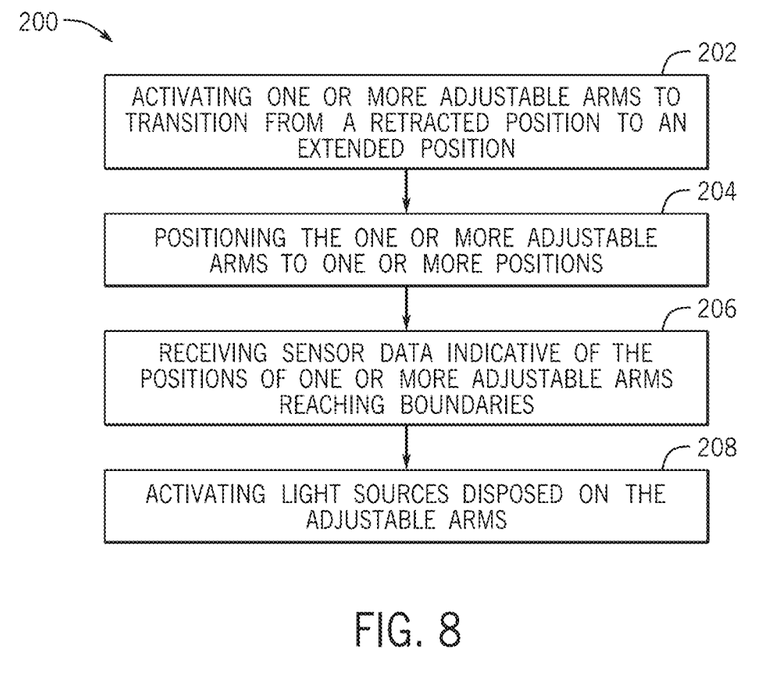
FIG. 8 is a process flow diagram illustrating a method of operation of a lighting system, in accordance with an embodiment of the present disclosure.

FIG. 8 is a process flow diagram illustrating an embodiment of a method 200 of operating the lighting system. Blocks of the method 200 may be performed by elements of the lighting system as discussed herein. It should be noted, that the illustrated blocks are provided as examples and more, fewer, or different blocks may be included in the method 200 of the lighting system. The method 200 includes, at block 202, activating one or more adjustable arms to transition from a retracted position to an extended position. The adjustable arms may be positioned parallel to a central support structure in the retracted position. As such, the lighting system may be inserted through a port of an element in the retracted position. The adjustable arms of the lighting system 12 may then be extended in the extended position. In some instances, the adjustable arms may generate an elliptical shape with respect to the central support structure. In some embodiments, the adjustable arms may extend laterally from the central support structure. As such, a first end of the adjustable arms may be coupled (e.g., hinged) to a first end of the central support structure. It should be noted, that in an embodiment the control system activates the adjustable arms to transition from the retracted position to the extended position. In an alternative embodiment, the adjustable arms may be manually extended from the retracted position to the extended position.

At block 204, the lighting system may position the one or more adjustable arms into one or more positions. For example, in the extended position the adjustable arms may be positioned to illuminate specific areas of an element, a themed element, a themed environment, and the like. In some embodiments, the positions of the adjustable arms may be dynamically changed in the extended position. This may include moving the adjustable arms and/or controlling activation of light sources. In this manner, the adjustable arms may generate lighting effects based on instructions received from the control system.

In some embodiments, one or more sensors may provide sensor data indicative of one or more positions of the adjustable arms of the lighting system. At block 206 of the method 200, the control system may receive sensor data indicative of the positions of the adjustable arms reaching one or more boundaries and may control the lighting system based on the sensor data (e.g., by moving the adjustable arms and/or controlling the light sources). The boundaries may include one or more predetermined boundaries and/or detected boundaries of elements. In some instances, the lighting system is positioned within the element and the boundaries may include one or more location of internal walls of the element. At block 208 the lighting system activates a plurality of light sources disposed on the adjustable arms. In some embodiments, the light sources are transitioned from an "OFF" state to an "ON" state. The light sources may be controlled individually by the control system 32 (e.g., based on sensor data or a timing algorithm). One or more properties (e.g., color, intensity, lumen output, warmth, saturation, and the like) of the light sources may be dynamically controlled. Indeed, the lighting system may be used to customize lighting in elements of different shape, form, size, and the like without requirement of customization of a rigging system.

While only certain features of the disclosed technology have been illustrated and described herein, many modifications and changes will occur to those skilled in the art. It is, therefore, to be understood that the appended claims are intended to cover all such modifications and changes as fall within the true spirit of the disclosure. Furthermore, although the steps of the disclosed flowchart/s are shown in a given order, in certain embodiments, the depicted steps may be reordered, altered, deleted, and/or occur simultaneously.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A lighting system, comprising:
   a central support structure;
   one or more adjustable arms coupled to the central support structure, wherein the one or more adjustable arms are configured to transition between a retracted position and an extended position;
   a plurality of light sources disposed along the one or more adjustable arms;
   a controller, configured to control actuation and positioning of the one or more adjustable arms;
   one or more sensors configured to provide sensor data indicative of the positioning of the one or more adjustable arms; and
   a processing system of the controller configured to activate one or more portions of the plurality of light sources based on the sensor data.

2. The lighting system of claim 1, wherein the extended position of the one or more adjustable arms forms an elliptical shape around the central support structure of the lighting system.

3. The lighting system of claim 1, wherein the lighting system comprises:
a first end of the one or more adjustable arms, wherein the first end of the one or more adjustable arms is coupled to the central support structure in the extended position; and
a second end of the one or more adjustable arms, wherein the second end of the one or more adjustable arms extends laterally from the central support structure of the lighting system in the extended position.

4. The lighting system of claim 1, wherein the one or more adjustable arms are positioned substantially parallel to the central support structure in the retracted position.

5. The lighting system of claim 1, wherein the adjustable arms are controlled to expand to the extended position within an internal volume of an element, and wherein the element is illuminated by the plurality of light sources.

6. The lighting system of claim 1, wherein the central support structure comprises a steering assembly.

7. The lighting system of claim 1, wherein the central support structure comprises a mount.

8. The lighting system of claim 1, wherein the plurality of light sources are LEDs.

9. The lighting system of claim 1, wherein one or more temperature sensors provide sensor data indicative of a temperature proximate the plurality of light sources.

10. The lighting system of claim 1, wherein the one or more sensors are configured to detect a presence of the one or more adjustable arms in relation to one or more boundaries of an element in which the lighting system is disposed.

11. The lighting system of claim 1, wherein the controller is configured to individually control a respective position of each of the one or more adjustable arms.

12. A method of lighting a themed element with a lighting system from within an internal volume of the themed element, the method comprising:
activating one or more adjustable arms of the lighting system to transition between a retracted position and an extended position such that a plurality of light sources disposed on the adjustable arms are transitioned toward boundaries of the internal volume;
receiving, at a controller, sensor data indicative of positioning of the one or more adjustable arms;
controlling, via the controller, actuators of the one or more adjustable arms based on the sensor data; and
activating the plurality of light sources disposed on the one or more adjustable arms based on the sensor data.

13. The method of claim 12, comprising mounting a central support structure of the lighting system within the internal volume of the themed element, wherein one or more adjustable arms are coupled to the central support structure.

14. The method of claim 12, comprising adjusting the one or more adjustable arms to provide dynamic lighting effects based instructions from the controller.

15. The method of claim 12, comprising controlling, via the controller, a lumen output of the plurality of light sources.

16. The method of claim 12, further comprising: individually controlling, via the controller, a position of each of the one or more adjustable arms.

17. A lighting system, comprising:
a central support structure;
one or more adjustable arms coupled to the central support structure, wherein the one or more adjustable arms are configured to transition between a retracted position and an extended position;
a plurality of light sources disposed along the one or more adjustable arms;
a controller, configured to control a position of the one or more adjustable arms; and
one or more sensors configured to provide sensor data to the controller, wherein the sensor data is indicative of positioning of the one or more adjustable arms; and
a processing system of the controller configured to activate one or more portions of the plurality of light sources based on the sensor data.

18. The lighting system of claim 17, wherein the controller is configured to control power to the plurality of light sources.

19. The lighting system of claim 17, wherein the sensor data is indicative of the positioning of the one or more adjustable arms relative to boundaries of an element in which the lighting system is disposed.

20. The lighting system of claim 19, wherein the central support structure and adjustable arms are configured to be installed into a port of the element with the adjustable arms in the retracted position.

* * * * *